(12) United States Patent
Kido

(10) Patent No.: US 8,989,439 B2
(45) Date of Patent: Mar. 24, 2015

(54) ENVIRONMENT RECOGNITION DEVICE AND ENVIRONMENT RECOGNITION METHOD

(75) Inventor: Shinnosuke Kido, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 308 days.

(21) Appl. No.: 13/459,572

(22) Filed: Apr. 30, 2012

(65) Prior Publication Data

US 2012/0288149 A1 Nov. 15, 2012

(30) Foreign Application Priority Data

May 12, 2011 (JP) ................................. 2011-107692

(51) Int. Cl.
*G06K 9/00* (2006.01)
(52) U.S. Cl.
CPC ........ *G06K 9/00825* (2013.01); *G06K 9/00805* (2013.01)
USPC .......................................................... 382/103
(58) Field of Classification Search
None
See application file for complete search history.

(56) References Cited

U.S. PATENT DOCUMENTS

2010/0074469 A1* 3/2010 Nakamori et al. ............ 382/103

FOREIGN PATENT DOCUMENTS

| JP | 3349060 B2 | 11/2002 |
| JP | 2010-224925 A | 10/2010 |

* cited by examiner

*Primary Examiner* — Atiba O Fitzpatrick
(74) *Attorney, Agent, or Firm* — McDermott Will & Emery LLP

(57) ABSTRACT

There are provided an environment recognition device and an environment recognition method. An environment recognition device 130 provisionally determines a specific object corresponding to a target portion from a luminance of the target portion, groups target portions of which differences in the width direction, and the height direction are within a first predetermined range and which are provisionally determined to correspond to a same specific object into a target object, sequentially detects, from any target objects, target objects of which differences in the width direction, in the height direction, and in the relative distance are within a second predetermined range, and which are provisionally determined to correspond to a same specific object, thereby specifying a target object group, and determines whether or not the target object group is the specific object according to the number of the target objects in the target object group.

2 Claims, 14 Drawing Sheets

FIG. 4

| IDENTIFICATION NUMBER | | 1 | 2 | 3 | 4 | 5 | 6 | 7 | 8 |
|---|---|---|---|---|---|---|---|---|---|
| SPECIFIC OBJECT | | TRAFFIC LIGHT (RED) | TRAFFIC LIGHT (YELLOW) | TRAFFIC LIGHT (BLUE) | TAIL LAMP (RED) | TURN SIGNAL (ORANGE) | ROAD SIGN (RED) | ROAD SIGN (BLUE) | ROAD SIGN (GREEN) |
| LUMINANCE RANGE | RED | ≥150 | ≥150 | ≤50 | ≥200 | ≥100 | ≥100 | ≤50 | ≤100 |
| | GREEN | ≤100 | ≥100 | ≥150 | ≤50 | ≥60 | ≤60 | ≤50 | ≥150 |
| | BLUE | ≤50 | ≤50 | ≥100 | ≤50 | ≤50 | ≤50 | ≥200 | ≤100 |
| WIDTH RANGE (m) | | 0.2 TO 0.4 | 0.2 TO 0.4 | 0.2 TO 0.4 | 0.1 TO 0.2 | 0.1 TO 0.2 | 0.3 TO 1.0 | 0.3 TO 1.0 | 0.3 TO 1.0 |

FIG. 5

| IDENTIFICATION NUMBER | | 1 | 2 | 3 |
|---|---|---|---|---|
| SPECIFIC OBJECT | | TRAFFIC LIGHT | TUNNEL LIGHT | STREET LAMP |
| DIFFERENCE RANGE (m) | x | ≤2.0 | ≤2.0 | ≤2.0 |
| | y | ≤1.0 | ≤1.0 | ≤3.0 |
| | z | ≥20.0 | ≤10.0 | ≤10.0 |
| NUMBER | | ≤2 | ≥3 | ≥3 |
| REGULARITY | | NO | CURVE APPROXIMATION | CURVE APPROXIMATION |

FIG. 8A
FIG. 8B
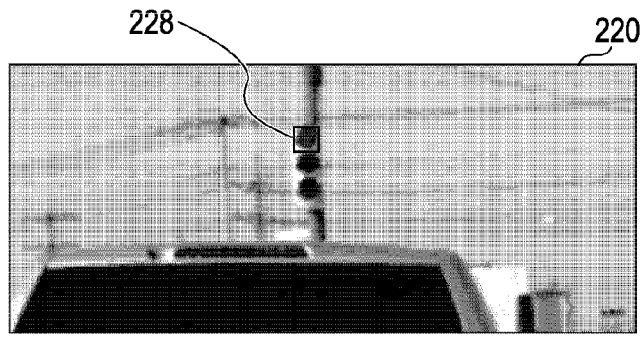

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107692 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based on luminances of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461).

Further, in such techniques, there is a technique that performs more advanced control. Specifically, it not only specifies a target object uniformly as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, there is known a technique that recognizes, when the captured image is a color image, a light source such as a traffic light as a target object by grouping a set of pixels with a same luminance (color) (for example, JP-A No. 2010-224925). However, when a resolution of the image capturing device that captures the detection area is low, or when the captured light source is located at distance, a luminance (color) and size of a light source which is different from a traffic light are unlikely to correctly be recognized and may be similar to the luminance and size of a lighting portion of the traffic light. In this case, simply grouping plural pixels having similar color characteristics may cause the light source, which should be recognized a light source different from a traffic light, to be falsely recognized as the traffic light.

BRIEF SUMMARY OF THE INVENTION

The present invention has been devised in order to solve the above problem and an object thereof is to provide an environment recognition device and an environment recognition method that improve the accuracy of specifying of a target object based on a regularity of the target object in order to avoid false recognition.

In order to solve the above problems, an aspect of the present invention provides an environment recognition device that includes: a data retaining unit that retains association between a range of luminance and a specific object; a luminance obtaining unit that obtains a luminance of a target portion in a detection area of a luminance image; a specific object provisional determining unit that provisionally determines the specific object corresponding to the target portion from the luminance based on the association retained in the data retaining unit; a grouping unit that groups target portions, of which positions differences in the width and height directions are within a first predetermined range and which are provisionally determined to correspond to a same specific object, into a target object; a position information obtaining unit that obtains a relative distance of the target portion; a target object group specifying unit that sequentially detects a target object, of which position differences from a position of one of the other target objects in the width, height, and depth directions fall within a second predetermined range and which is provisionally determined to correspond to a same specific object as the one target object, thereby specifying a target object group; and a specific object determining unit that determines whether or not the target object group is the specific object according to the number of the target objects in the target object group.

The specific object determining unit may determine that the target object group is not the specific object when the number of the target objects exceeds a predetermined threshold value.

In order to solve the above problems, another aspect of the present invention provides an environment recognition device that includes: a data retaining unit that retains a range of luminance in association with a specific object; a luminance obtaining unit that obtains a luminance of a target portion in a detection area of a luminance image; a specific object provisional determining unit that provisionally determines the specific object corresponding to the target portion from the luminance based on the association retained in the data retaining unit; a grouping unit that groups target portions of which position differences in the width direction and a difference in the height direction are within a first predetermined range and which are provisionally determined to correspond to a same specific object into a target object; a position information obtaining unit that obtains a relative distance of the target portion; a target object group specifying unit that sequentially detects, from any target objects, target objects of which differences in the width direction, in the height direction, and in the relative distance fall within a second predetermined range, and which are provisionally determined to correspond to a same specific object, thereby specifying a target object group; and a specific object determining unit that determines whether or not the target object group is the specific object according to a height distribution of the target objects in the target object group.

The specific object determining unit may determine that the target object group is not the specific object when the number of the target objects included in the target object group exceeds a predetermined threshold value.

In order to solve the above problems, another aspect of the present invention provides an environment recognition method that includes: obtaining a luminance of a target portion in a detection area of a luminance image; obtaining a relative distance of the target region; provisionally determining a specific object corresponding to the target portion from the luminance of the target portion based on the association, which is retained in a data retaining unit, between a luminance range and a specific object; grouping target portions, of which positions differences in the width and height directions are within a predetermined range and which are provisionally determined to correspond to a same specific object, into a target object; sequentially detecting a target object, of which position differences from a position of one of the other target objects in the width, height, and depth directions fall within a second predetermined range and which is provisionally determined to correspond to a same specific object as the one target object, thereby specifying a target object group; and determining whether or not the target object group is the specific object according to the number of the target objects in the target object group.

BRIEF DESCRIPTION OF THE SEVERAL VIEWS OF THE DRAWINGS

FIG. 4 is an explanatory diagram for explaining a specific object table;

FIG. 5 is an explanatory diagram for describing a regularity table;

FIGS. 8A and 8B are explanatory views illustrating processing of a grouping unit;

FIGS. 9A and 8B are explanatory views illustrating processing of the grouping unit;

DETAILED DESCRIPTION OF THE INVENTION

Figure 1:
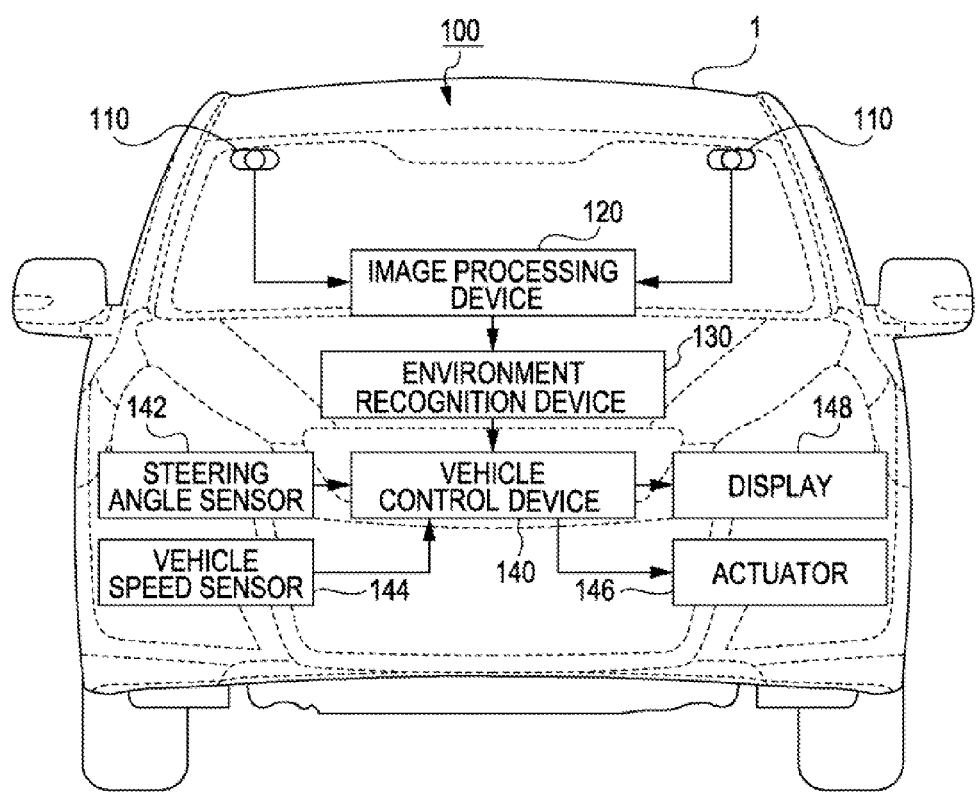
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of image capturing devices 110 (two image capturing devices 110 in the present embodiment), an image processing device 120, an environment recognition device 130, and a vehicle control device 140 that are provided in a vehicle 1. The image capturing devices 110 include an imaging element such as a CCD (Charge-Coupled Device) and a CMOS (Complementary Metal-Oxide Semiconductor), and can obtain a color image, that is, luminances of three color phases (red, green, blue) per pixel. In the present embodiment, color and luminance are dealt in the same way; if both wordings are included in one sentence, both can be read as luminance configuring color, or color having luminances. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing device 110 continuously generates image data obtained by capturing an image of a target object existing in a detection area in front of the vehicle 1 at every 1/60 seconds (60 fps) for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative distance) with image data is referred to as a distance image.

Figure 2A:
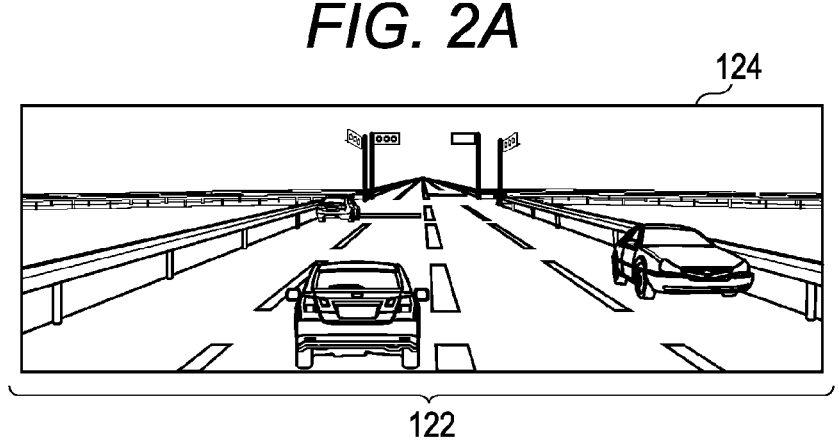
FIGS. 2A and 2B are explanatory diagrams for explaining a luminance image and a distance image.
Figure 2B:
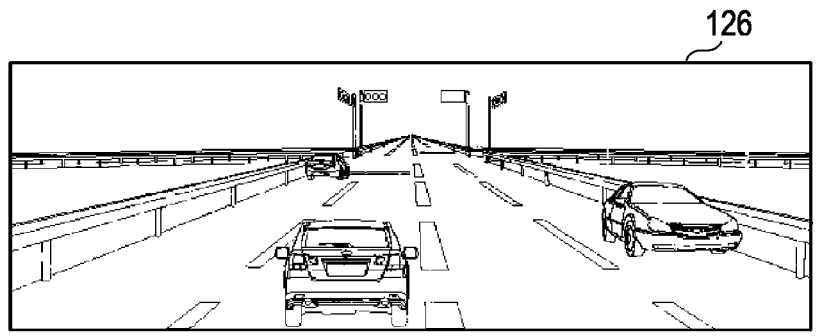

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 and a relative distance from the subject vehicle 1 based on the distance image 126 to determine which specific object the target object in the detection area 122 corresponds to. In this embodiment, the environment recognition device 130 uses a so-called stereo method to convert the parallax information for each block in the detection area 122 of the distance image 126 into three-dimensional position information including a relative distance, thereby deriving heights. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Environment Recognition Device 130)

Figure 3:
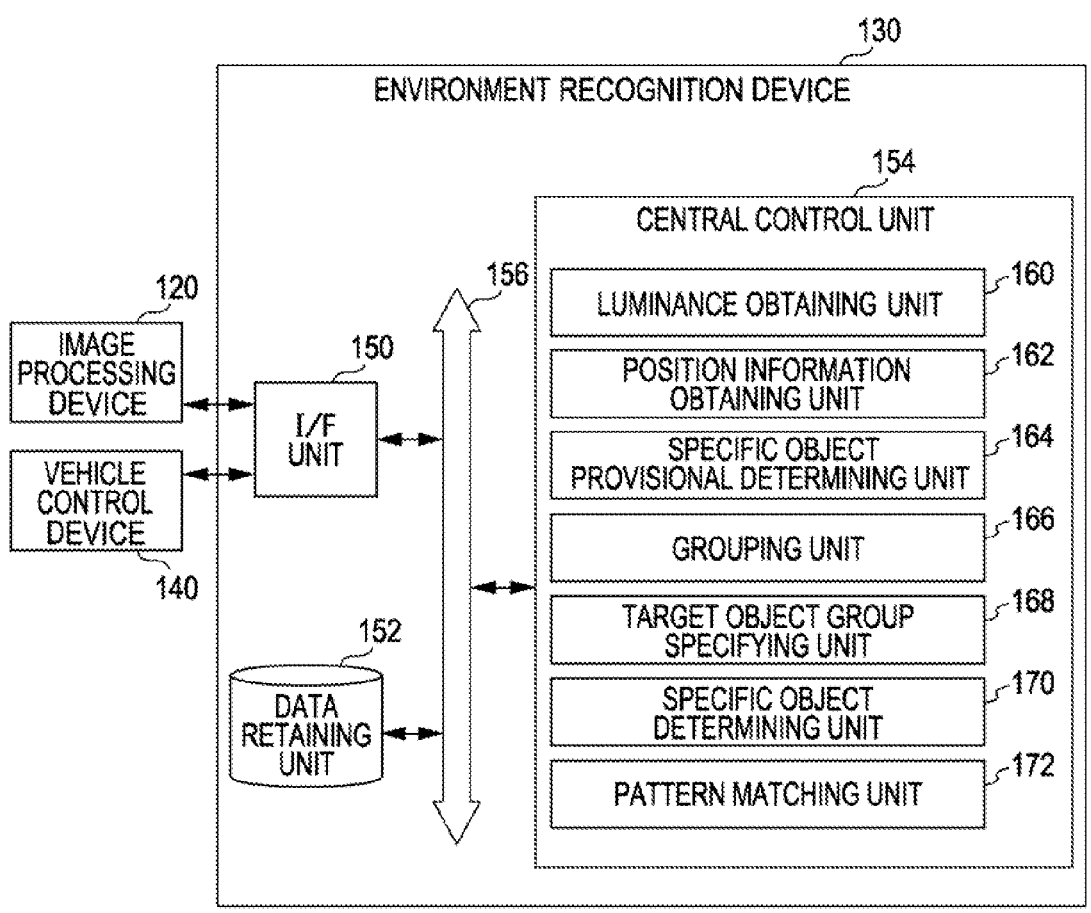
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a specific object table (association), a regularity table, and various kinds of information required for processing performed by each functional unit explained below. In addition, the data retaining unit 152 temporarily retains the luminance image 124 and the distance image 126 received from the image processing device 120. The specific object table and the regularity table are used as follows.

FIG. 4 is an explanatory diagram for explaining a specific object table 200. In the specific object table 200, a plurality of specific objects are associated with a luminance range 202 indicating a range of luminance, and a width range 204 indicating a range of size of the specific objects. The specific objects include various objects required to be observed while the vehicle runs on the road, such as "traffic light (red)", "traffic light (yellow)", "traffic light (blue)", "tail lamp (red)", "turn signal (orange)", "road sign (red)", "road sign (blue)", and "road sign (green)". It is to be understood that the specific object is not limited to the objects in FIG. 4. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with luminance (red) "150 or more", luminance (green) "100 or less", luminance (blue) "50 or less" and width range "0.2 to 0.4 m".

In the present embodiment, based on the specific object table 200, any target portion among any target portions in the luminance image 124 that satisfies the condition of the luminance range 202 with regard to any specific object, and is adopted as a candidate for the specific object. For example, when the luminances of a target portion is included in the luminance range 202 of the specific object "traffic light (red)", the target portion is adopted as a candidate for the specific object "traffic light (red)". Then, when the target object made by grouping the target portions is extracted in a form which appears to be a specific object, for example, when the size of a grouped target object is included in the width range "0.2 to 0.4 m" of the "traffic light (red)", it is determined to be the specific object. The target portion determined to be the specific object is labeled with an identification number unique to the specific object. Pixel or a block made by collecting pixels may be used as the target portion. Hereafter, in the present embodiment pixels are used the target portion for the sake of convenience of explanation.

FIG. 5 is an explanatory diagram for describing a regularity table 210. In the regularity table 210, a difference range 212 indicating a three-dimensional position relationship between same specific objects, an expected number 214 of a specific object when the same specific objects are recognized together, and a regularity 216 between the same specific objects are associated with a plurality of specific objects. The specific objects in the regularity table 210 include various objects various objects that can be recognized as a light source while the vehicle 1 is running on a road, such as a "traffic light", a "tunnel light", or a "street lamp". It is needless to say that the specific object is not limited to those described in FIG. 5. Among the specific objects, for example, a specific object "traffic light (red)" is associated with difference range (x) "2.0 m or less", difference range (y) "1.01 or less", difference range (z) "20.0 m or more", number "two or less", and "no regularity".

Referring to FIG. 5, even in the case of target objects (for example, tunnel light) that correspond to a same specific object and might be regarded as the traffic light based on only the luminances and size, they can be specified as a tunnel light or street lamp when the number of the target objects is three or more and the target objects are located close to each other. If the target objects can be approximated with a curve, it is highly likely that the target objects are the tunnel light or the street lamp. Accordingly, it is possible to specify that at least the target objects are not the traffic light.

The central control unit 154 is comprised of a semiconductor integrated circuit including, for example, a central processing unit (CPU), a ROM storing a program and the like, and a RAM serving as a work area, and controls the I/F unit 150 and the data retaining unit 152 through a system bus 156. In the present embodiment, the central control unit 154 also functions as a luminance obtaining unit 160, a position information obtaining unit 162, a specific object provisional determining unit 164, a grouping unit 166, a target object group specifying unit 168, a specific object determining unit 170, and a pattern matching unit 172.

The luminance obtaining unit 160 obtains luminances by the target portion (pixels) (luminances of three color phases (red, green, and blue) per pixel) from the received luminance image 124 according to a control instruction of the specific object provisional determining unit 164 explained later. At this time, when it is, for example, rainy or cloudy in the detection area, the luminance obtaining unit 160 may obtain the luminances after adjusting white balance so as to obtain the original luminances.

The position information obtaining unit 162 uses the stereo method to convert parallax information for each block in the detection area 122 of the distance image 126 into three-dimensional position information including the width direction x, the height direction from the road surface y, and the depth direction z from the subject vehicle 1 according to a control instruction of the The position information obtaining unit 162 uses the stereo method to convert parallax information for each block in the detection area 122 of the distance image 126 into three-dimensional position information including the width direction x, the height direction y from the road surface, and the depth direction z according to a control instruction of the grouping unit 166 explained later. The parallax information represents a parallax of each target portion in the distance image 126, whereas the three-dimensional position information represents information about the relative distance of each target portion in the real world. Accordingly, a term such as the horizontal distance, the height and the relative distance refers to a distance in the real world, whereas a term such as a detected distance refers to a distance in the distance image 126. When the parallax information is not derived by the pixel but is derived by the block, that is, a calculation may be executed in units of pixels with the parallax information being deemed as parallax information about all the pixels which belong to a block.

Figure 6:
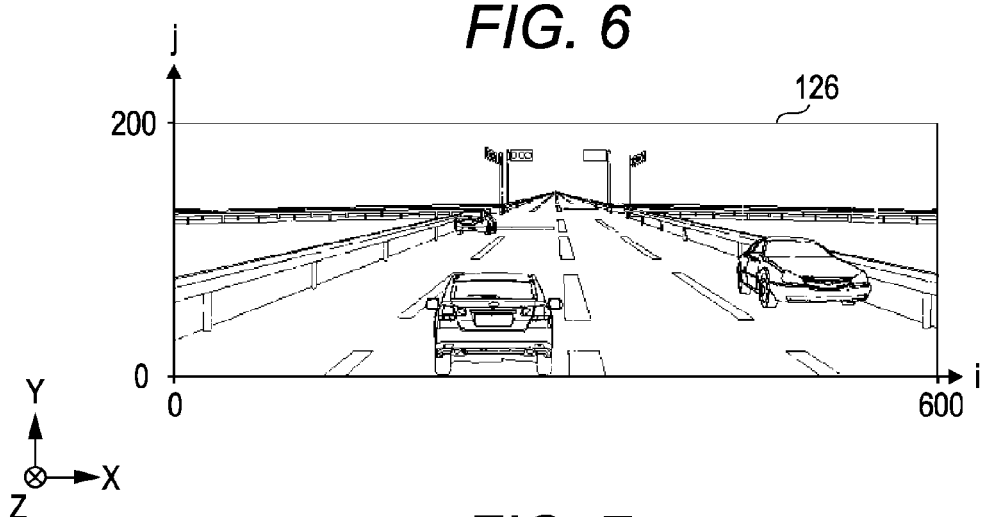
FIG. 6 is an explanatory diagram for explaining conversion into three-dimensional position information performed by a position information obtaining unit.

FIG. 6 is an explanatory diagram for explaining conversion into three-dimensional position information by the position information obtaining unit 162. First, the position information obtaining unit 162 treats the distance image 126 as a coordinate system in a pixel unit as shown in FIG. 6. In FIG. 6, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0). The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the image capturing devices 110, PW denotes a corresponding distance in the real world to a distance between adjacent pixels in the image, so-called like an angle of view per pixel, CB denotes an disposed height of the image capturing device 110 from the road surface, IV and JV denote coordinates (pixels) in the image at an infinity point in front of the vehicle 1, and KS denotes a distance coefficient (KS=CD/PW).

The specific object provisional determining unit 164 provisionally determines a specific object listed on the specific object table 200 retained in the data retaining unit 152 referring to the luminances and the height of the target object.

More specifically, the specific object provisional determining unit 164 firstly causes the luminance obtaining unit 160 to obtain the luminances of any given target portion in the luminance image 124. Subsequently, the specific object provisional determining unit 164 sequentially selects any specific object from the specific objects registered in the specific object table 200, and determines whether the obtained luminances are included in the luminance range 202 of the specific object sequentially selected. Then, when the luminances are determined to be in the luminance range 202, the target portion is provisionally determined to be the specific object, and an identification number representing the specific object is assigned to the target portion so that a specific object map is generated.

The specific object provisional determining unit 164 sequentially executes a series of comparisons between the luminances of the target portions and the luminance range 202 of the specific objects registered in the specific object table 200. The order selecting the specific objects in the specific object table 200 as explained above also shows the order of priority. That is, in the example of the specific object table 200 of FIG. 4, the comparison processing is executed in the following order: "traffic light (red)", "traffic light (yellow)", "traffic light (blue)", "tail lamp (red)", "turn signal (orange)", "road sign (red)", "road sign (blue)", and "road sign (green)".

When the comparison is performed according to the above order of priority, and as a result, the luminances of the target portion are determined to be included in the luminance range 202 of a specific object of a high order of priority, the comparison processing is no longer performed for specific objects of a lower order of priority. Therefore, only one identification number representing one specific object is assigned. This is because a plurality of specific objects do not overlap in the real world, and thus a target object that is once determined to be any given specific object is no longer determined to be another specific object. By exclusively treating the target portions in this manner, it is possible to avoid redundant specifying processing for the same target portion that is already provisionally determined to be a specific object, and the processing load can be reduced.

Figure 7:
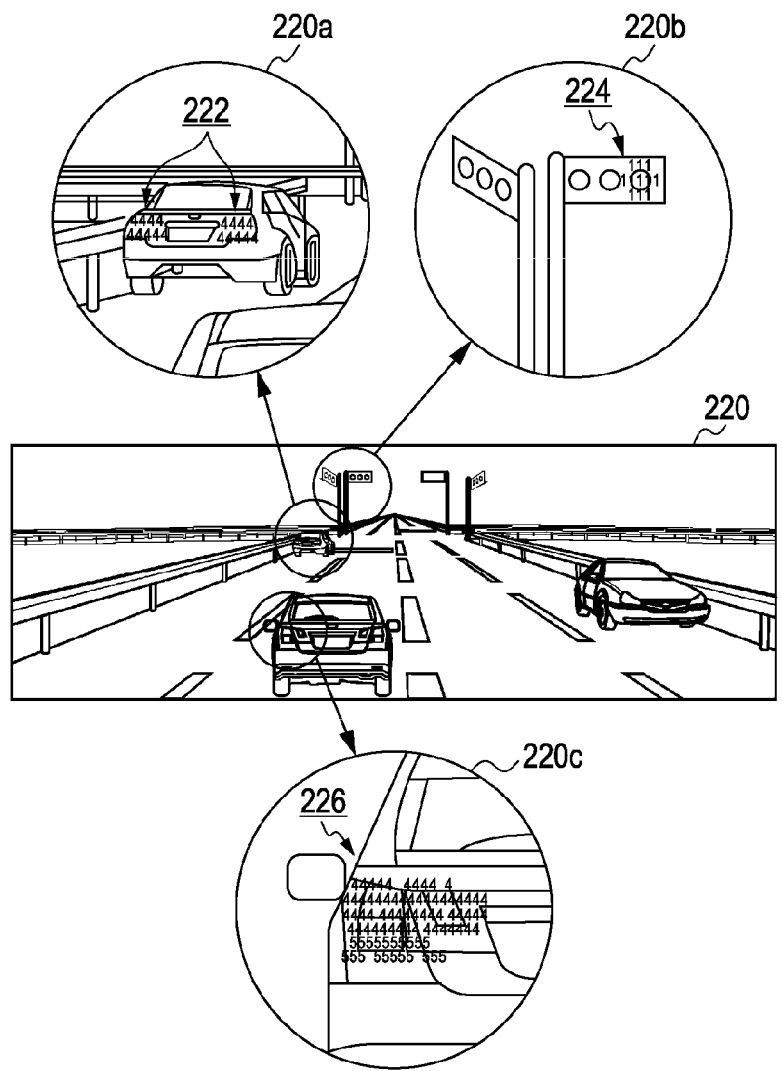
FIG. 7 is an explanatory diagram for explaining a specific object map.

FIG. 7 is an explanatory diagram for explaining a specific object map 220. The specific object map 220 is made by overlaying the identification numbers of the specific objects on the luminance image 124, and the identification number of the specific object is assigned to a position corresponding to the target portion provisionally determined to be the specific object.

For example, in a segment 220a of the specific object map 220, the luminances of target portions 222 corresponding to the tail lamps of the preceding vehicle are compared with the luminance range 202 of the specific objects "traffic light (red)", "traffic light (yellow)", "traffic light (blue)", and "tail lamp (red)" in order. As a result, since the luminances are included in the luminance range 202 of the specific object "tail lamp (red)", an identification number "4" of the specific object "traffic light (red)" is assigned. In a segment 220b of the specific object map 220, the luminances of target portions 224 corresponding to the light-emitting portions at the right side of the traffic light are included in the luminance range 202 of the specific object "traffic light (red)", and therefore, an identification number "1" of the specific object "traffic light (red)" is assigned. Further, in a segment 220c of the specific object map 220, the luminances of target portions 226 corresponding to the back surface lamp portion of the preceding vehicle are compared with the luminance range 202 of the specific objects "traffic light (red)", "traffic light (yellow)", and "traffic light (blue)" in order, and finally, an identification number "4" of the specific object "tail lamp (red)" and an identification number "5" of the specific object "turn signal (orange)" are assigned. FIG. 7 shows a figure in which identification numbers are assigned to target portions of the luminance image 124. This is, however, a conceptual representation for the sake of easy understanding. In reality, identification numbers are registered as data at the target portions.

The grouping unit 166 adopts any given target portion provisionally determined as a base point, and groups the relevant target portions provisionally determined to correspond to a same specific object (attached with a same identification number) of which position differences in the width direction x and in the height direction y are within a first predetermined range, thereby making the grouped target portions into a target object. The first predetermined range may be independently set for each of the distance in the width direction x and the distance in the height direction y. The grouping is performed by, for example, extracting, from the multiple target portions, a target portion whose distance in the width direction x is the leftmost (xl), a target portion whose distance in the width direction width x is the rightmost (xr), a target portion whose height y is the minimum (ymin), and a target portion whose distance in the height direction y is the maximum (ymax), and enclosing the multiple target portions with a rectangle having four lines, that are x=xl, x=xr, y=ymin, and y=ymax. Therefore, the number of target portions constituting the grouped target object is equal to or more than the number of target portions serving as the basis of the grouping.

The first predetermined range is represented as a distance in the real world, and can be set at any given value (for example, 1.0 m). The grouping unit 166 also adopts the target portion newly added through the grouping processing as a base point and groups the relevant target portions which are provisionally determined to correspond to a same specific object and of which position differences in the width direction x and in the height direction y are within a predetermined range. Consequently, as long as the distance between the target portions provisionally determined to be the same specific object is within the first predetermined range, all of such target portions are grouped.

In this case, the grouping unit 166 makes the determination using the distance in the with direction x and the distance in the height direction y in the real world, but when a determination is made using the detection distances in the luminance image 124 and the distance image 126, the threshold value of the first predetermined range for grouping is changed according to the relative distance z of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed. In the case in which the determination is made based on the detection distance on the distance image 126, the first predetermined range may be defined by the number of pixels. For example, (adjacent) pixels having a gap of one pixel therebetween in the horizontal direction or the vertical direction may be grouped.

In the above description, each of the difference in the width direction x and the difference in the height direction y is independently determined, and only when both of them are included within the first predetermined range, the target portions are grouped into the same group. However, grouping processing may be performed using another calculation. For example, when a square mean value √ of the difference in the width direction x and the difference in the height direction y ((difference in the width distance x)$^2$+(difference in the height direction y)$^2$) is included within the first predetermined range, target portions may be grouped into the same group. With such calculation, distances between target portions in the real world can be derived accurately, and therefore, grouping accuracy can be enhanced.

FIGS. 8A and 8B and FIGS. 9A and 9B are explanatory diagrams for explaining processing of the grouping unit 166. In the drawings, identification numbers are omitted for the purpose of easy understanding. For example, the grouping unit 166 groups adjacent target portions that are provisionally determined to correspond to the specific object "traffic light (red)" with respect to the identified object map 220 as illustrated in FIG. 8A, and the grouping unit 166 produces a target object 228 as illustrated in FIG. 8B. As a result, the specific object "traffic light (red)" is extracted.

Figure 9A:
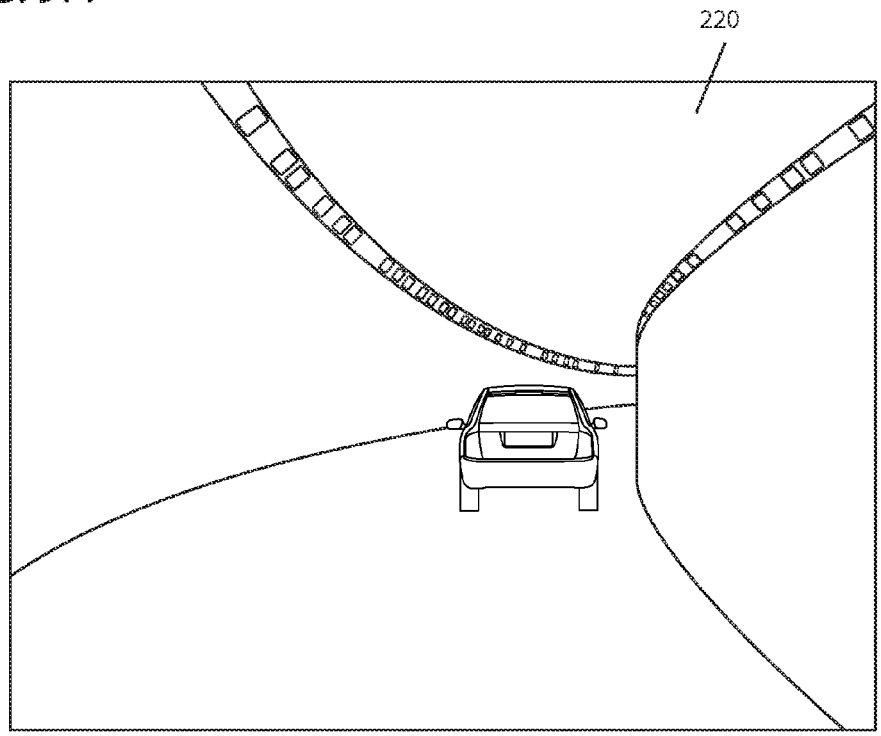
Figure 9B:
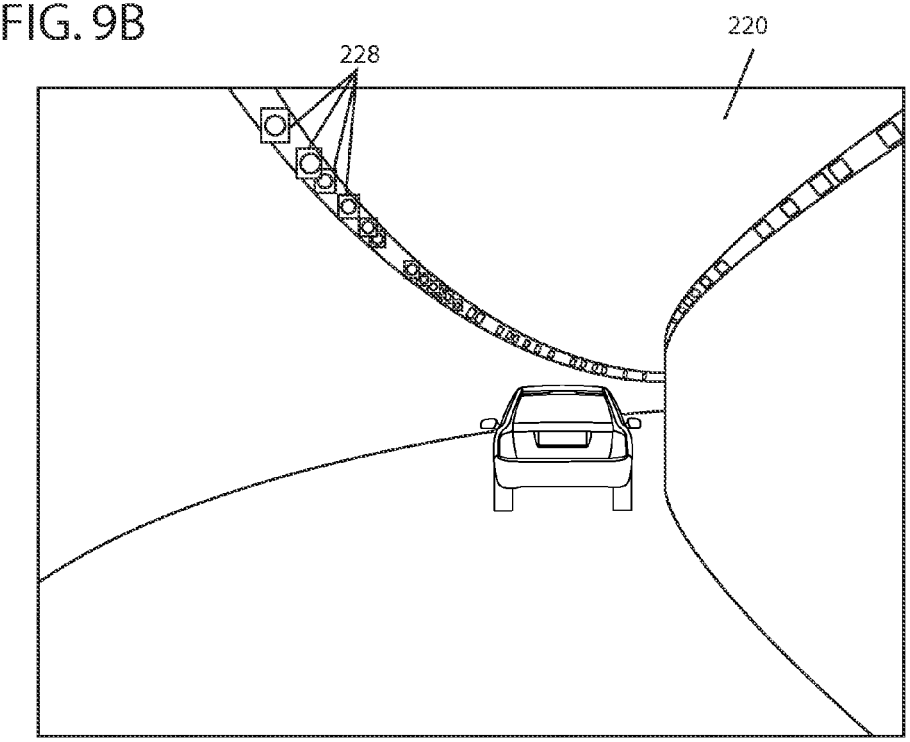

Similarly, when the vehicle 1 is running in a tunnel illustrated in FIG. 9A, the grouping unit 166 groups the target portions that correspond to a plurality of tunnel lights mounted on the inner peripheral surface of the tunnel, thereby deriving a target object 228 as illustrated in FIG. 9B. In this case, when the luminances (color) or size of the tunnel light illustrated in FIG. 9A are similar to those of the lighting portion of the traffic light (red), the tunnel light may be falsely recognized as the specific object "traffic light (red)".

Here, the traffic light in FIG. 8A and the tunnel light in FIG. 9A are different as follows: The traffic light appears solely or randomly in the detection are, while the tunnel light appears regularly. Accordingly, tunnel lights are often disposed such that any tunnel light tunnel light is continuously disposed within a predetermined range from another tunnel light. Further, the number of the continuously disposed tunnel light is large (for example, 3 or more). Since tunnel lights are regularly disposed, the tunnel lights can be approximated by a straight line or multiple-order curve. In the present embodiment, if there is target object that are provisionally determined to be a same specific object near a light-emitting portion (target object), they are collectively set as a target object group. The regularity of the target object group is clarified in order to appropriately specify the target object group (target object). The target object group specifying unit 168 and the specific object determining unit 170, which are used to implement such appropriate identification of the target object group, will be described below.

The target object group specifying unit 168 sequentially detects a target object of which differences in the width direction x, in the height direction y, and in the relative distance z fall within the second predetermined range and that is provisionally determined to correspond to a same specific object, from any target objects grouped by the grouping unit 166, and specifies them collectively as a target object group. The second predetermined range is the difference range 212 illustrated in the regularity table 210 in FIG. 5. The second predetermined range is basically wider than the first predetermined range, and may be independently set for each of the distance in the width direction x, the distance in the height direction y, and the relative distance z.

The present embodiment firstly specifies that a detected light source is not the traffic light, but the tunnel light, in order to prevent the tunnel light from being falsely determined to be the traffic light, for example. Therefore, the difference range (x) "2.0 m or less", the difference range (y) "1.0 m or less", and the difference range (z) "10.0 m or less" of the tunnel light are set as the second predetermined range. When there is a target object corresponding to the same specific object of another target object t within the second predetermined range, the target object group specifying unit 168 specifies these target objects as a target object group. Specifying the target objects means only associating the target objects without performing any edition. In the present embodiment, the target object group specifying unit 168 associates the target objects, which are within the second predetermined range and provisionally determined to correspond to the same specific object by setting a flag to the target objects.

Figure 10:
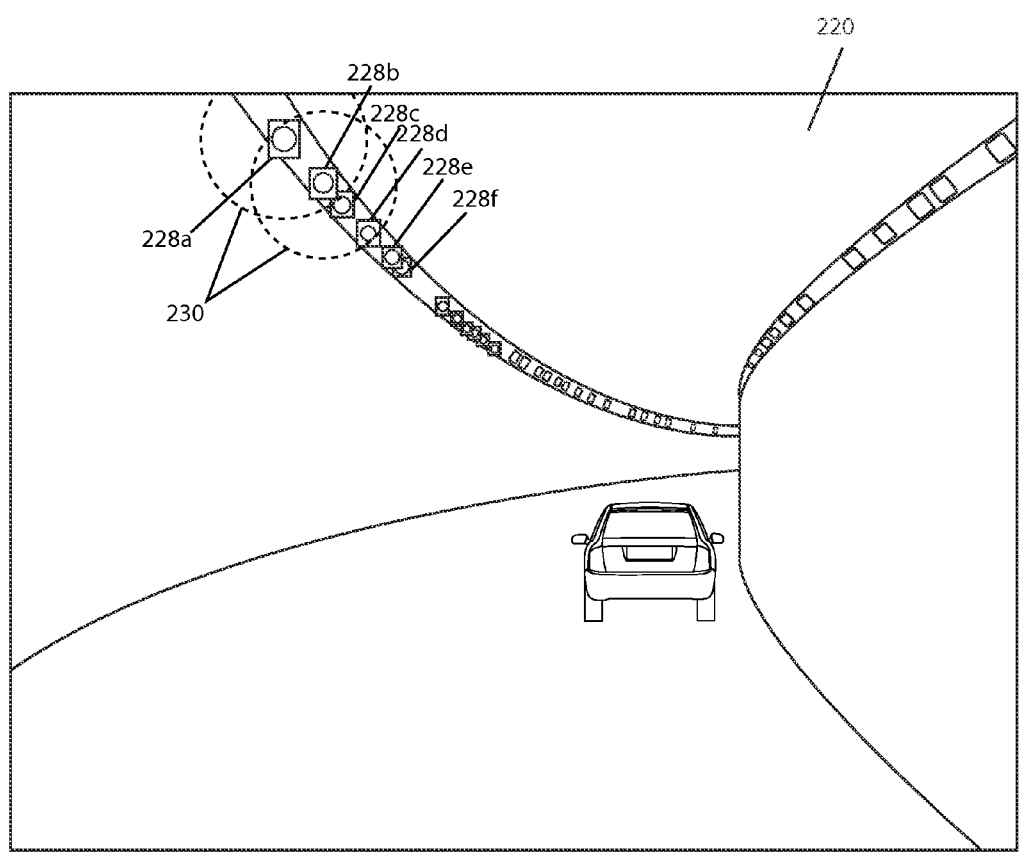
FIG. 10 is an explanatory view illustrating processing of a target object group specifying unit.

FIG. 10 is an explanatory view for illustrating processing of the target object group specifying unit 168. The target object group specifying unit 168 firstly obtains the difference range 212 of the tunnel light as the second predetermined range 230. The target object group specifying unit 168 sets to the target object 228a a flag that indicates that a target object 228a on the upper-left portion of the image is likely to be the tunnel lig. As illustrated in FIG. 10, with the target object 228a located on the upper left of the image as the base point, the target object group specifying unit 168 searches for a target portion within second predetermined range 230 that corresponds to a same specific object as the target object, from the center (barycenter) position of the target object 218a. Here, a target object 228b corresponds to the specific object same as the target object 228a, and the distances between them are such that the difference in the horizontal distance x is 0.3 m, the difference in the height y is 0.2 m, and the difference in the relative distance z is 4.0 m. This means that the target object 228b is within the second predetermined range 230. Therefore, the target object group specifying unit 168 sets the flag same as that for the target object 228a to the target object 228b.

Next, with the target object 228b as the base point, the target object group specifying unit 168 detects another target object 228 that corresponds to the same specific object as the target object 228a, within the second predetermined range 230. The target object group specifying unit 168 similarly sets the flag same as that for the target object 228a to the target object 228. In this manner, the target object group specifying unit 168 sequentially detects target objects that can be regarded as a same specific object, whereby a plurality of target objects 228 (228a, 228b, 228c, 228d, 228e, and 228f) are continuously detected. As a result, it is possible to specify a target object group that is a set of the target objects 228 which are closely disposed.

The specific object determining unit 170 firstly determines the specific object to which the target object group corresponds according to the number of the target objects 228 in the target object group specified by the target object group specifying unit 168. Specifically, the specific object determining unit 170 determines the target object group in which the number of the target objects exceeds a predetermined threshold value as a specific object different from the intended specific object (which is specified by the identification number assigned to the target object), and determines that the target object group is not the intended specific object.

It is assumed, for example, that the intended specific object is the specific object of "traffic light (red)". When the luminances or size of the tunnel light is similar to that of the traffic light (red), the target object 228 corresponding to the tunnel light might be regarded as the specific object "traffic light (red)", as described with reference to FIGS. 8A to 9B. In this case, the number of the target objects in the target object group specified by the target object group specifying unit 168 is 6 as illustrated in FIG. 10. Accordingly, the number of the target objects in the target object group corresponds to the number 214 of the specific object "tunnel light" in the regularity table 210, but is different from the number 214 of the specific object "traffic light". Consequently, the target object group is at least determined not to be the specific object "traffic light". However, there is still the possibility that the target object group is the specific object of "tunnel light". In this manner, it is possible to avoid another light source such as the tunnel light from falsely being recognized as the specific object "traffic light".

The specific object determining unit 170 may also determine whether or not the target objects in the target object group satisfy a predetermined regularity, in addition to the determination for the number of the target objects. When they satisfy the predetermined regularity, the specific object determining unit 170 may determine that the target object group corresponds to a specific object different from the intended specific object, and may determine the target object group as not being the specific object "traffic light (red)", for example. The regularity means the one for specifying a specific object to be excluded, and corresponds to the regularity 216 of the specific object (that is, the tunnel light) to be excluded, in the regularity table 210. For example, the target object group (target objects 228a, 228b, 228c, 228d, 228e, and 228f) illustrated in FIG. 10 can be approximated with at least multiple-order curve on the image and on the real space. In this case, the approximate curve of the target objects can be specified by linear approximation by the Hough transform or the least squares method. Therefore, this target object group corresponds to the regularity 216 for the specific object "tunnel light" in the regularity table 210, so that it can be estimated at least not to be the specific object "traffic light". In this manner, even if the target object group cannot clearly be specified only by the number of the target objects, it can be determined that the target object group is at least not the specific object of traffic light".

Next, the specific object determining unit 170 determines whether or not remaining target objects excluding the target object group that is determined not to be the intended specific object satisfy the predetermined condition. If they satisfy the condition, the specific object determining unit 170 determines the target objects as a specific object. For example, when the width range 204 is given in the specific object table 200 as shown in FIG. 4, and the size of a target object (both the distance in the width direction x and the distance in the height direction y) is included in the width range 204 of a specific object provisionally determined with regard to the target object on the basis of the specific object table 200, the specific object determining unit 170 determines the target object as the specific object. A separate width range 204 may be set for each of the distance in the width direction x and the distance in the height direction y. Here, it is examined whether the target object is of a size adequate to be deemed as a specific object. Therefore, when the size of the target object is not included in the width range 204, the target object can be excluded as information unnecessary for the environment recognition processing.

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the subject vehicle, this indicates that the subject vehicle 1 has to stop or decelerate. When the specific object "tail lamp (red)" is extracted, this indicates that there is a preceding vehicle travelling together with the subject vehicle 1 and that the back surface of the preceding vehicle is at the relative distance z of the specific object "tail lamp (red)".

When a specific object determined by the specific object determining unit 170 is, for example, a "sign" and it is assumed that the specific object indicates a speed limit, the pattern matching unit 172 further executes pattern matching for a numerical value indicated therein, and specifies the numerical value. In this manner, the environment recognition device 130 can recognize the speed limit and the like of the traffic lane in which the subject vehicle is travelling.

In the present embodiment, the specific object determining unit 170 first extracts a plurality of limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Figure 11:
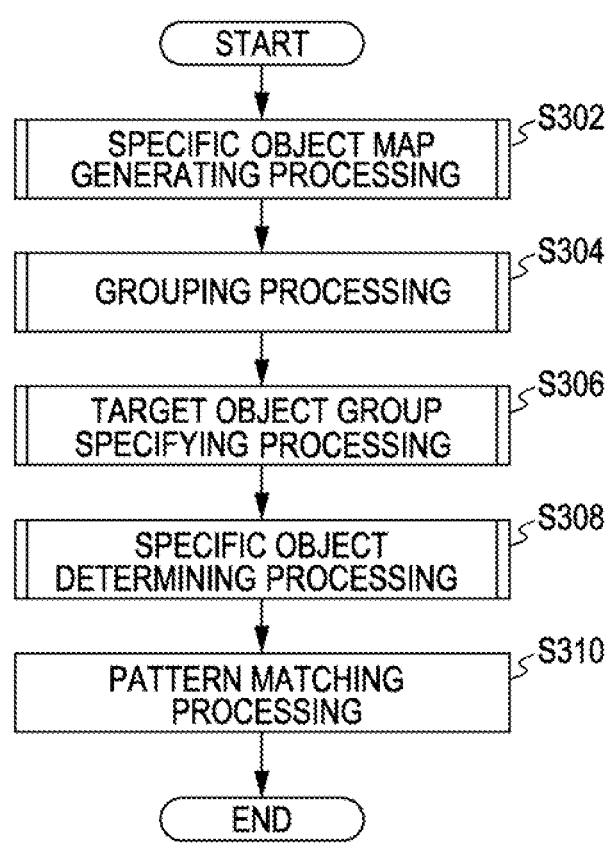
FIG. 11 is a flowchart illustrating an overall flow of an environment recognition method.

Hereinafter, the particular processings performed by the environment recognition device 130 will be explained based on the flowchart shown in FIGS. 11 to 15. FIG. 11 illustrates an overall flow of interrupt processing when the image processing device 120 transmits the distance image (parallax information) 126. FIGS. 12 to 15 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects to be checked is assumed to be eight.

As shown in FIG. 11, when an interrupt occurs according to the environment recognition method in response to reception of the distance image 126, the luminance image 124 obtained from the image processing device 120 is referred to, and a specific object map 210 is generated (S302).

Subsequently, the specific objects provisionally determined are made into a group (S304), the grouped target objects are collected to specify the target object group (S306), and the grouped target objects are determined as a specific object (S308). If it is necessary to further obtain information from the specific object thus determined, the pattern matching unit 174 executes the pattern matching on the specific object (S310). Hereinafter, the above processing will be explained more specifically.

(Specific Object Map Generating Processing S302)

Figure 12:
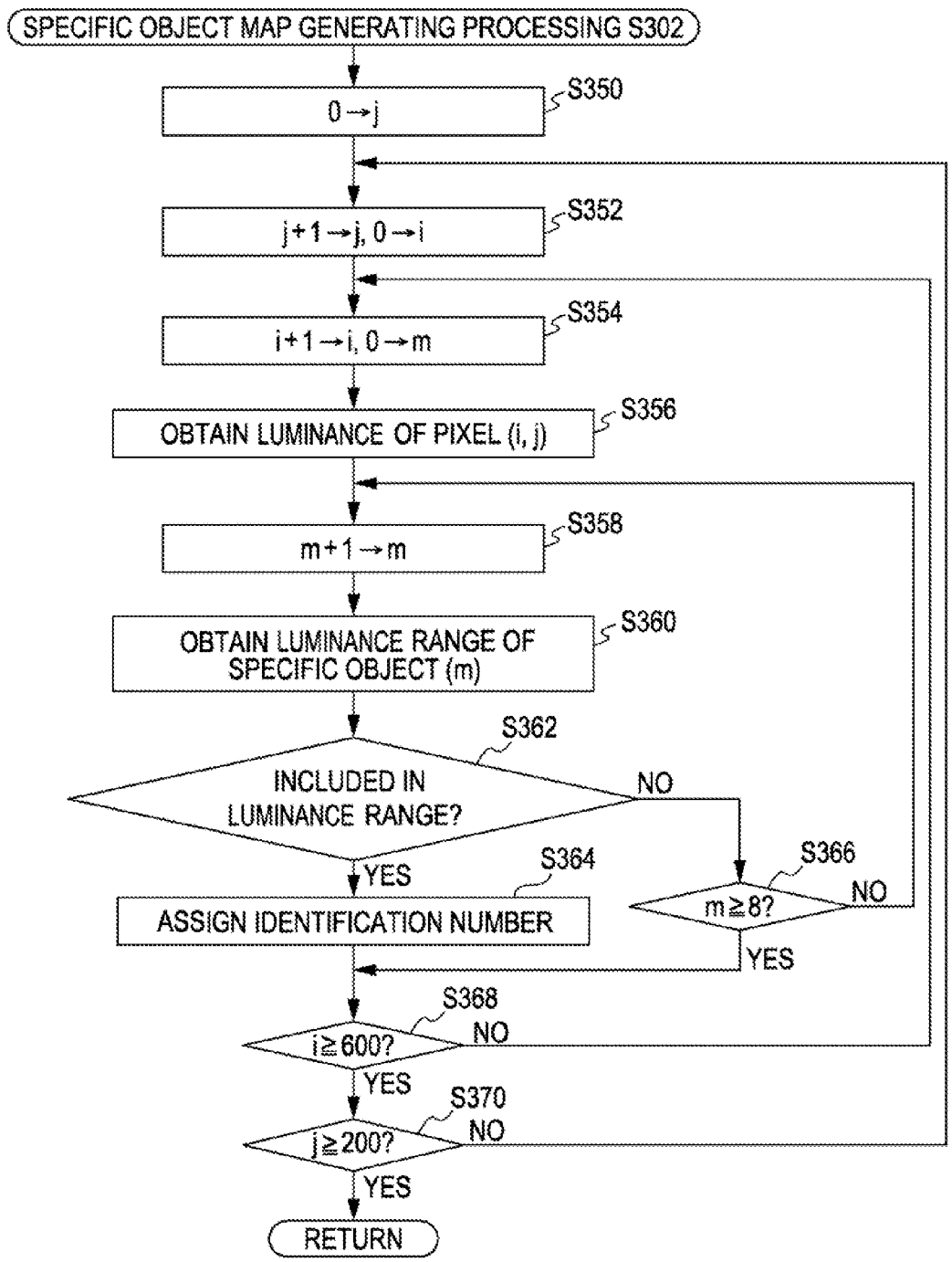
FIG. 12 is a flowchart illustrating a flow of specific object map generating processing.

As shown in FIG. 12, the specific object provisional determining unit 164 initializes (substitutes "0" to) a vertical variable j for specifying a target portion (pixel) (S350). Subsequently, the specific object provisional determining unit 164 adds "1" to (increments by 1) the vertical variable j, and initializes (substitutes "0" to) a horizontal variable i (S352). Then, the specific object provisional determining unit 164 adds "1" to the horizontal variable i, and initializes (substitutes "0" to) a specific object variable m (S354). Here, the horizontal variable i and the vertical variable j are provided to execute the specific object map generating processing on all of the 600×200 pixels, and the specific object variable m is provided to sequentially compare eight specific objects for each pixel.

The specific object provisional determining unit 164 causes the luminance obtaining unit 160 to obtain luminances of a pixel (i, j) as a target portion from the luminance image 124 (S356), adds "1" to the specific object variable m (S358), obtains the luminance range 202 of the specific object (m) (S360), and determines whether or not the luminances of the pixel (i, j) are included in the luminance range 202 of the specific object (in) (S362).

When the luminances of the pixel (i, j) are included in the luminance range 202 of the specific object (m) (YES in S362), the specific object provisional determining unit 164 assigns an identification number p representing the specific object (m) to the pixel so as to be expressed a pixel (i, j, p) (S364). In this manner, the specific object map 210 is generated, in which a identification number is given to each pixel in the luminance image 124. When the luminances of the pixel (i, j) is not included in the luminance range 202 of the specific object (m) (NO in S362), a determination is made as to whether or not the specific object variable m is equal to or more than 8 which is the maximum number of specific objects (S366). When the specific object variable m is less than the maximum value (NO in S366), the processings are repeated from the increment processing of the specific object variable m in step S358. When the specific object variable m is equal to or more than the maximum value (YES in S366), which means that there is no specific object corresponding to the pixel (i, j), the processing in step S368 subsequent thereto is performed.

Then, the specific object provisional determining unit 164 determines whether or not the horizontal variable i is equal to or more than 600 which is the maximum value of pixel number in the horizontal direction (S368), and when the horizontal variable i is less than the maximum value (NO in S368), the processings are repeated from the increment processing of the horizontal variable i in step S354. When the horizontal variable i is equal to or more than the maximum value (YES in S368), the specific object provisional determining unit 164 determines whether or not the vertical variable j is equal to or more than 200 which is the maximum value of pixel number in the vertical direction (S370). Then, when the vertical variable j is less than the maximum value (NO in S370), the processings are repeated from the increment processing of the vertical variable j in step S352. When the vertical variable j is equal to or more than the maximum value (YES in S370), the specific object map generating processing is terminated.

(Grouping Processing S304)

Figure 13:
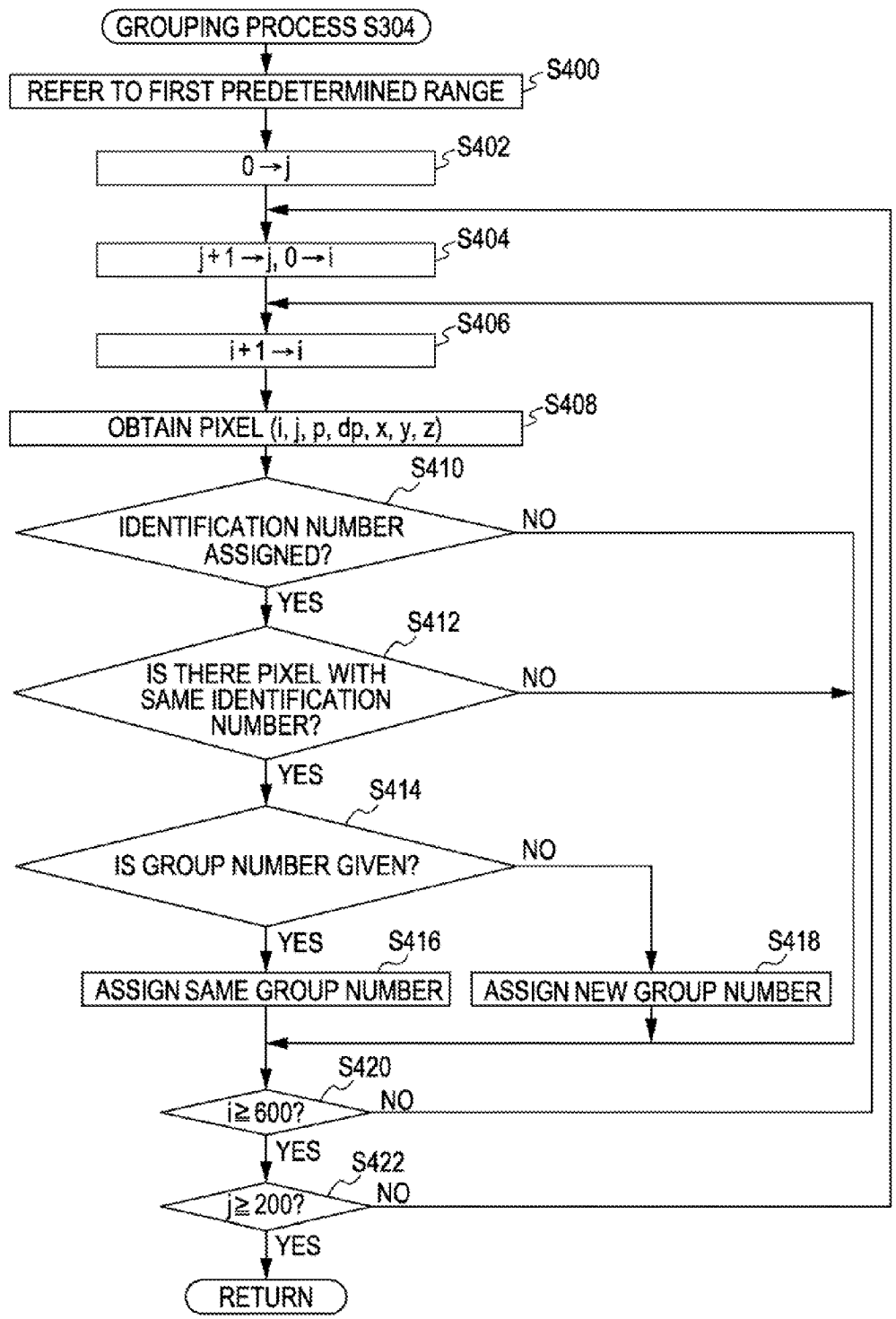
FIG. 13 is a flowchart illustrating a flow of target portion grouping processing.

As shown in FIG. 13, the grouping unit 166 refers to the first predetermined range to group target portions (S400), and initializes (substitutes "0" to) the vertical variable j for specifying a target portion (pixel) (S402). Subsequently, the grouping unit 166 adds "1" to the vertical variable j, and initializes (substitutes "0" to) the horizontal variable i (S404). Then, the grouping unit 166 adds "i" to the horizontal variable i (S456).

The grouping unit 166 obtains a pixel (i, j, p, dp, g) as the target portion from the luminance image 124, transforms the coordinate of the pixel (i, j, p, dp, g) including the parallax information dp into a point (x, y, z) in the real world so as to be expressed as a pixel (i, j, p, dp, g, x, y, z) (S408). Then, a determination is made as to whether an identification number p of the specific object is assigned to the pixel (i, p, dp, g, x, y, z) (410). When the identification number p is assigned (YES in S410), the grouping unit 166 determines whether or not there is another pixel assigned the same identification number p in the first predetermined range from the coordinate position (x, y, z) in the real world of the pixel (i, j, p, dp, g, x, y, z) (S412).

When there is another pixel (i, j, p, p x, dp, x, z) assigned the same identification number (YES in S412), the grouping unit 166 determines whether the group number g is given to any of all the pixels within the predetermined range including the pixel under determination (S414). When the group number g is given to any of them (YES in S414), the grouping unit 166 assigns a value to all of the pixels included within the first predetermined range and all of the pixels to which the same group number g is given, the value being a smaller one of the smallest group number g among the group numbers given thereto or the smallest value of numbers that have not yet used as a group number so as to expressed as a pixel (i, j, p, dp, x, y, z, g) (S416). When the group number g is given to none of them (NO in S414), the smallest value of numbers that have not yet used as a group number is newly assigned to all the pixels within the first predetermined range including the pixel under determination (S418).

In this manner, when there is a plurality of target portions that have a same identification number within the first predetermined range, grouping process is performed by assigning one group number g. If a group number g is given to none of the plurality of target portions, a new group number g is assigned, and if a group number g is already given to any one of them, the same group number g is assigned to the other target portions. However, when there is a plurality of group numbers g in the plurality of target portions, the group numbers g of all the target portions are replaced with one group number g so as to treat the target portions as one group.

In the above description, the group numbers g of not only all the pixels included within the first predetermined range but also all the pixels to which the same group number g is given are changed at a time. The primary reason for this is to avoid dividing the group already unified by changing of the group numbers g. In addition, a smaller one of the smallest group number g or the smallest value of numbers that have not yet used as a group number is employed in order to avoid making a skipped number as much as possible upon group numbering. In so doing, the maximum value of the group number g does not become unnecessarily large, and the processing load can be reduced.

When an identification number p is not assigned (NO in S410), or when there is no other pixel that has the identification number p (NO in S412), the processing in step S420 subsequent thereto is performed.

Subsequently, the grouping unit 166 determines whether or not the horizontal variable i is equal to or more than 600 which is the maximum value of pixel number in the horizontal direction (S420). When the horizontal variable i is less than the maximum value (NO in S420), the processings are repeated from the increment processing of the horizontal variable i in step S456. When the horizontal variable i is equal to or more than the maximum value (YES in S420), the grouping unit 166 determines whether or not the vertical variable j is equal to or more than 200 which is the maximum value of pixel number in the vertical direction (S422). When the vertical variable j is less than the maximum value (NO in S422), the processings are repeated from the increment processing of the vertical variable in step S454. When the vertical variable j is equal to or more than the maximum value (YES in S422), the grouping processing is terminated.

(Target Object Group Specifying Processing S306)

Figure 14:
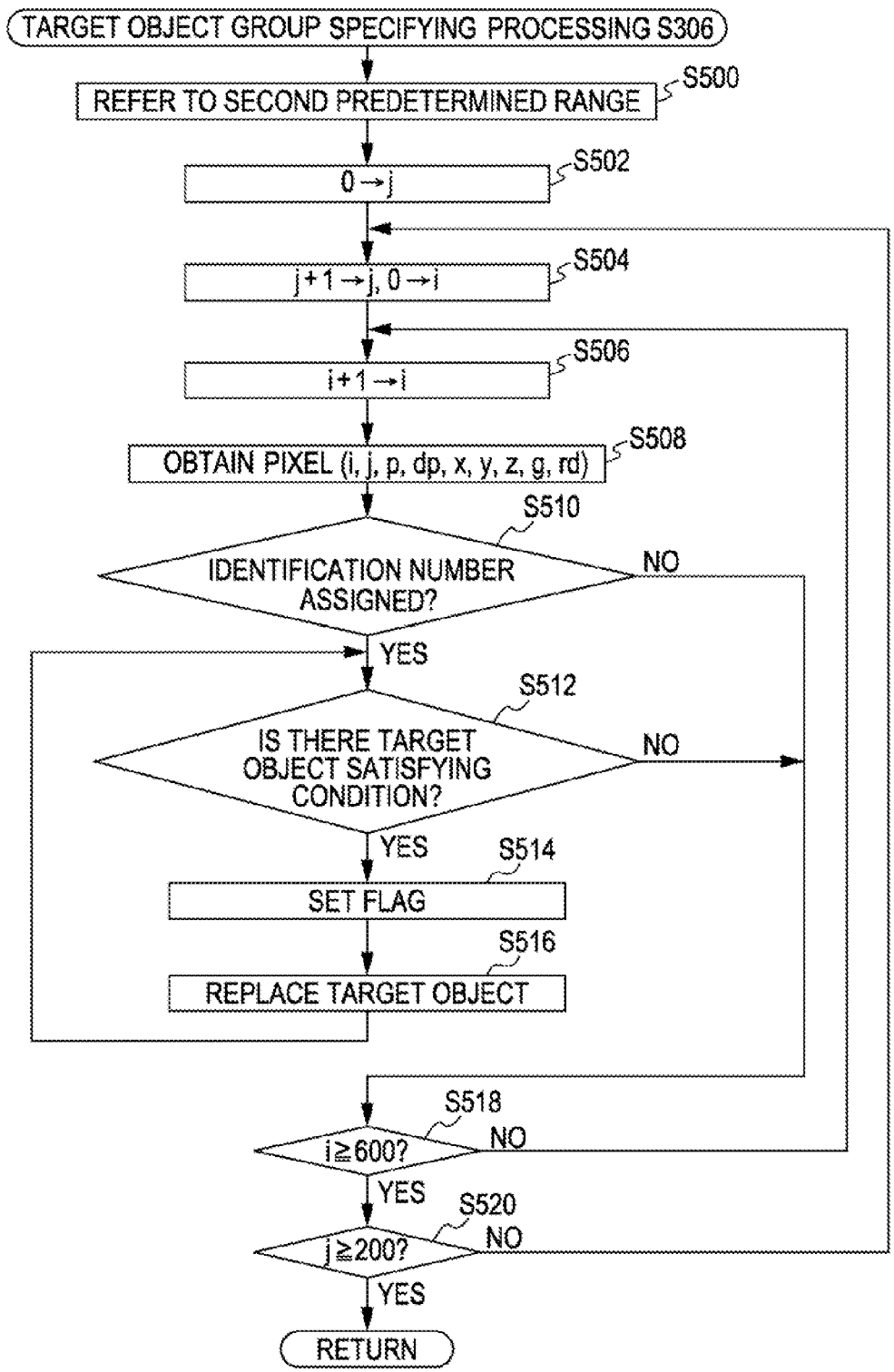
FIG. 14 is a flowchart illustrating a flow of target object grouping processing.

As shown in FIG. 14, the t target object group specifying unit 168 refers to the second predetermined range to group target portions (S500), and initializes (substitutes "0" to) the vertical variable j for specifying a target portion (pixel) (S502). Subsequently, the target object group specifying unit 168 adds "1" to the vertical variable j, and initializes (substitutes "0" to) the horizontal variable i (S504). Then, the target object group specifying unit 168 adds "1" to the horizontal variable i (S506).

The target object group specifying unit 168 obtains a pixel (i, j, p, dp, x, y, z, g) as the target portion from the luminance image 124 (S508). Then, a determination is made as to whether an identification number p of the specific object is assigned to the pixel (i, j, p, dp, x, y, z, g) (S510). When the identification number p is assigned (YES in S510), the target object group specifying unit 168 determines whether or not there is another target object that is assigned the same identification number p in the second predetermined range from the coordinate position (x, y, z) in the real world of the pixel and is not yet given a flag (S512).

When there is another target object, that is assigned the same identification number p, and is not given a flag (YES in S512), the target object group specifying unit 168 sets the same flag to the target object serving as the basis (base point) and the newly detected target object (S514). The target object group specifying unit 168 then replaces the target object, which is the basis of the determination within the second predetermined range, by the newly detected target object, and repeats the processings from the condition determination processing in step S512 (S516). In so doing, a neighboring target object is searched for not only the target object serving as the base point but also the newly detected target object.

When an identification number p is not assigned (NO in S510), or when there is no target object satisfying the conditions (NO in S512), the processing in step S518 subsequent thereto is performed.

Subsequently, the target object group specifying unit 168 determines whether or not the horizontal variable i is equal to or more than 600 which is the maximum value of pixel number in the horizontal direction (S518). When the horizontal variable i is less than the maximum value (NO in S518), the processings are repeated from the increment processing of the horizontal variable i in step S456. When the horizontal variable i is equal to or more than the maximum value (YES in S518), the target object group specifying unit 168 determines whether or not the vertical variable j is equal to or more than 200 which is the maximum value of pixel number in the vertical direction (S520). When the vertical variable j is less than the maximum value (NO in S520), the processings are repeated from the increment processing of the vertical variable j in step S504. When the vertical variable j is equal to or more than the maximum value (YES in S520), the grouping processing is terminated.

(Specific Object Determining Processing S308)

Figure 15:
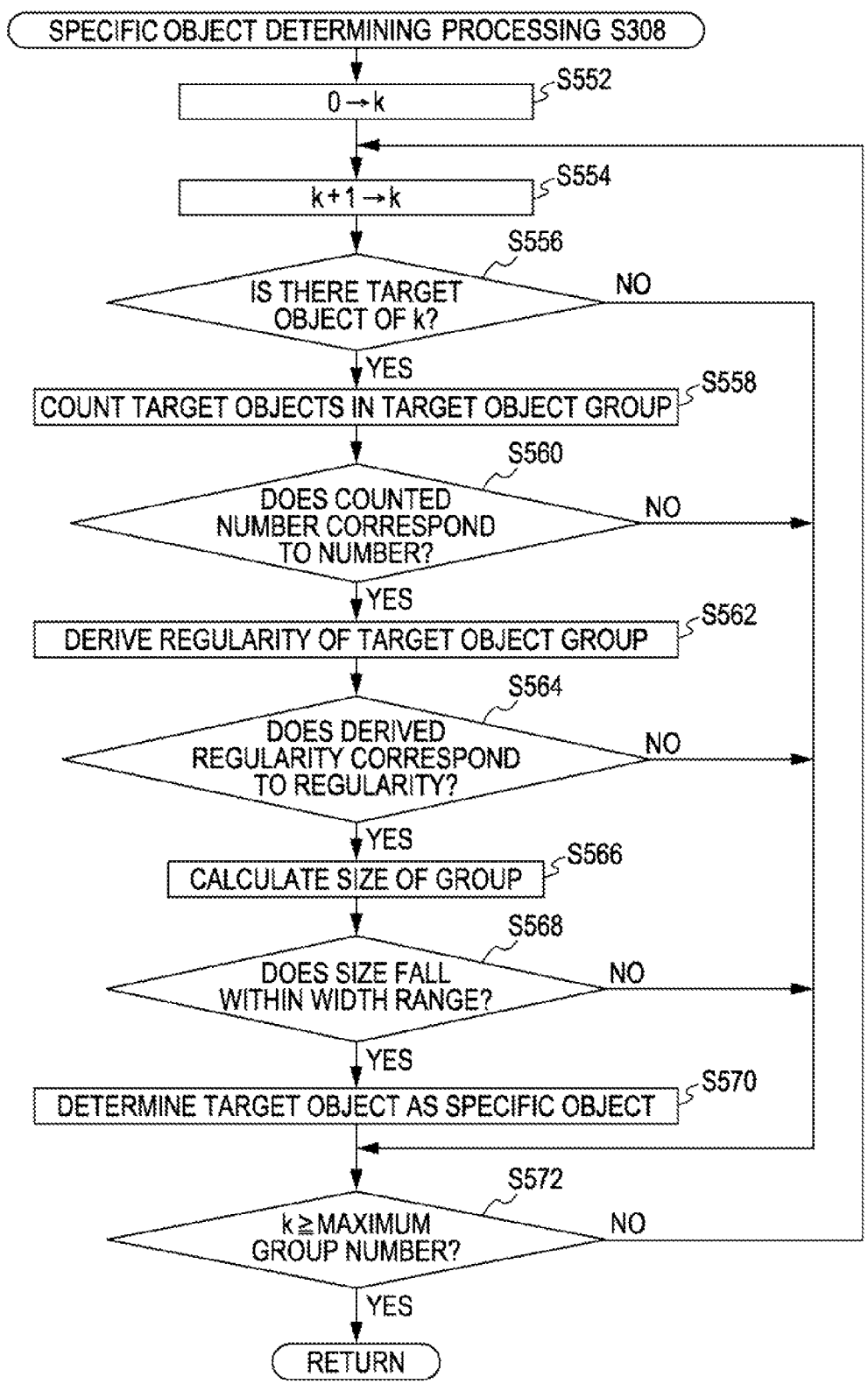
FIG. 15 is a flowchart illustrating a flow of specific object determining processing.

As shown in FIG. 15, the specific object determining unit 170 initializes (substitutes "0" to) a group variable k for specifying a group (S552). Subsequently, the specific object determining unit 170 adds "1" to the group variable k (S554).

The specific object determining unit 170 determines whether or not there is a target object of which group number g is the group variable k from the luminance image 124 (S556). When there is such target object (YES in S556), the specific object determining unit 170 counts target objects in the target object group to which the target object belong (S558). Then a determination is made as to whether or not the counted number corresponds to the number 214 of the specific object indicated by the identification number p, and the counted number does not correspond to the number of other specific objects (S560). When the counted number corresponds to the number of the specific objects indicated by the identification number p (YES in S560), the specific object determining unit 170 derives the regularity among the target objects in the target object group (S562). The specific object determining unit 170 then determines whether or not the regularity among the target objects corresponds to the regularity 216 of the specific object indicated by the identification number p, and does not correspond to the regularity 216 of other specific objects (S564).

When the regularity among the target objects corresponds to the regularity 216 of the specific object indicated by the identification number p (YES in S564), the specific object determining unit 170 calculates the size of the target object to which the group number g is given (S566). The size of the target object is specified by a width direction component that is a distance (difference) in the width direction between the pixel located at the left end on the image of the target object and the pixel located at the right end on the image and a height direction component that is a distance (difference) in the height direction between the pixel located at the upper end on the image of the target object and the pixel located at the lower end on the image. The specific object determination unit 172 determines whether or not the calculated size is included in the width range 204 of the specific object indicated by the identification number p associated with the target object having the group number g which is the group variable k (S568). For example, when the horizontal direction component of the size of the target object falls within the width range 204 of the specific object "traffic light (red)", and when the vertical direction component of the size of the target object falls within the width range 204 of the specific object "traffic light (red)", the specific object determination unit 172 can determine that the target object is included in the width range 204 of the identified object "traffic light (red)".

When the size is included within the width range 204 of the specific object represented by the identification number p (YES in S568), the specific object determining unit 170 determines that the target object is the specific object (S570). When there is no target object of which group number q is the group variable k (NO in S556), when the size is not included within the width range 204 of the specific object represented by the identification number p (NO in S556), when the counted number does not correspond to the number of the specific object indicated by the identification number p (NO in S560), when the derived regularity does not correspond to the regularity indicated by the identification number p (NO in S564), or when the size is not included within the width range 204 of the specific object represented by the identification number p (NO in S568), the processing in step S572 subsequent thereto is performed.

Subsequently, the specific object determining unit 168 determines whether or not the group variable k is equal to or more than the maximum value of group number set in the grouping processing (S572). Then, when the group variable k is less than the maximum value (NO in S572), the processings are repeated from the increment processing of the group variable k in step S502. When the group variable k is equal to or more than the maximum value (YES in S572), the specific object determining processing is terminated. As a result, the grouped target objects are formally determined to be the specific object.

As described above, even in the case where the luminances and size of the another specific object re similar to those of the intended specific object, and thus the another specific object might be regarded as the intended specific object, the environment recognition device 130 can appropriately determine whether the a target object is the intended specific object based on the regularity of the target object. Consequently, the accuracy of specifying the target object can be improved, whereby false recognition can be avoided.

Even in the case where a target object can be determined by the absolute height thereof, the specific object of the target object might erroneously be specified according to a road condition. In this case, the present embodiment may be complementarily applied, whereby the accuracy of specifying the target object can be significantly improved.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the embodiment described above, the specific object determining unit 170 determines the specific object to which a target object group corresponds according to the number of target objects in the target object group. However, the present invention is not limited thereto. The specific object determining unit 170 may determine the specific object to which the target object group corresponds according to the distribution of the heights of the target objects in the target object group. Specifically, when a difference between the height of each target object in a target object group and an average of the heights of the target objects falls within a third predetermined range, the specific object determining unit 170 determines that the target object group is another specific object and determines that the target object group is not an intended target specific object. The third predetermined range is optionally set only with a distance in the height direction y, and is smaller than the difference range 212 indicated in the regularity table 210 in FIG. 5.

With this configuration, the specific object can appropriately be determined according to the distribution of the heights of the target objects in the target object group, for example, according to whether the heights are distributed, or the heights have a same value. Accordingly, the accuracy of specifying the target object can be improved, whereby false recognition can be avoided.

In the present embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

In the above embodiment, the specific objects "traffic light (red)" and "tunnel light" are used for the explanation. However, the present invention may be applied to various specific objects such as the specific objects shown in the specific object table 200 of FIG. 4. For example, a light source that is appears solely or randomly, such as the "traffic light (yellow)" and the "traffic light (blue)" can relatively easily be distinguished from a light source that appears regularly, such as the "tunnel light" and the "street lamp" mounted on a roadside.

In the present embodiment, it is assumed that the image capturing device 110 obtains a color image. However, the present invention is not limited to such case. Alternatively, a monochrome image may be obtained. In this case, the specific object table 200 is defined by a single-color luminance.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load of the environment recognition device 130.

In the above embodiment, the luminance obtaining unit 160, the position information obtaining unit 162, the specific object provisional determining unit 164, the grouping unit 166, the target object group specifying unit 168, the specific object determining unit 170, and the pattern matching unit 172 are configured to be operated by the central control unit 154 with software. However, the functional units may be configured with hardware.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
    a data retaining unit that retains a range of luminance associated with a specific object;
    a luminance obtaining unit that obtains a luminance of a target portion in a detection area of a luminance image;
    a specific object provisional determining unit that provisionally determines that the target portion corresponds to the specific object when the luminance of the target portion falls within the range of luminance associated with the specific object, retained in the data retaining unit;
    a grouping unit that groups target portions into a first target object, each of the target portions to be grouped having positions differences in width and height directions within a first range, and being provisionally determined to correspond to the same specific object;
    a position information obtaining unit that obtains a relative distance in a depth direction to the first target object from a vehicle having the environment recognition device;
    a target object group specifying unit that sequentially detects at least one second target object, the second target object having position differences from the first target object in the width, height, and relative distance, which fall within a second range wider than the first range, and being provisionally determined to correspond to the same specific object as the first target object, thereby specifying the first target object and the second target object as a target object group; and
    a specific object determining unit that determines that the target object group is not the specific object, but another specific object when the number of target objects including the first and second target objects included in the target object group exceeds a threshold value.

2. An environment recognition method to be performed by an environment recognition device having a data retaining unit that retains a range of luminance associated with a specific object, the method comprising:
    obtaining a luminance of a target portion in a detection area of a luminance image;
    provisionally determining that the target portion corresponds to the specific object when the luminance of the target portion falls within the range of luminance associated with the specific object;
    grouping target portions into a first target object, each of the target portions to be grouped having positions differences in width and height directions within a first range, and being provisionally determined to correspond to the same specific object;
    obtaining a relative distance in a depth direction to the target region from a vehicle having the environment recognition device;
    sequentially detecting at least one second target object, the second target object having position differences from the first target object in the width, height, and relative distance, which fall within a second range wider than the first range, and being provisionally determined to correspond to the same specific object as the first target object, thereby specifying the first target object and the second target object as a target object group; and
    determining that the target object group is not the specific object, but another specific object when the number of target objects including the first and second target objects included in the target object group exceeds a threshold value.

* * * * *